Aug. 19, 1941.  F. E. ARNDT  2,252,690
MATERIAL SPREADER
Filed March 19, 1937  3 Sheets-Sheet 1
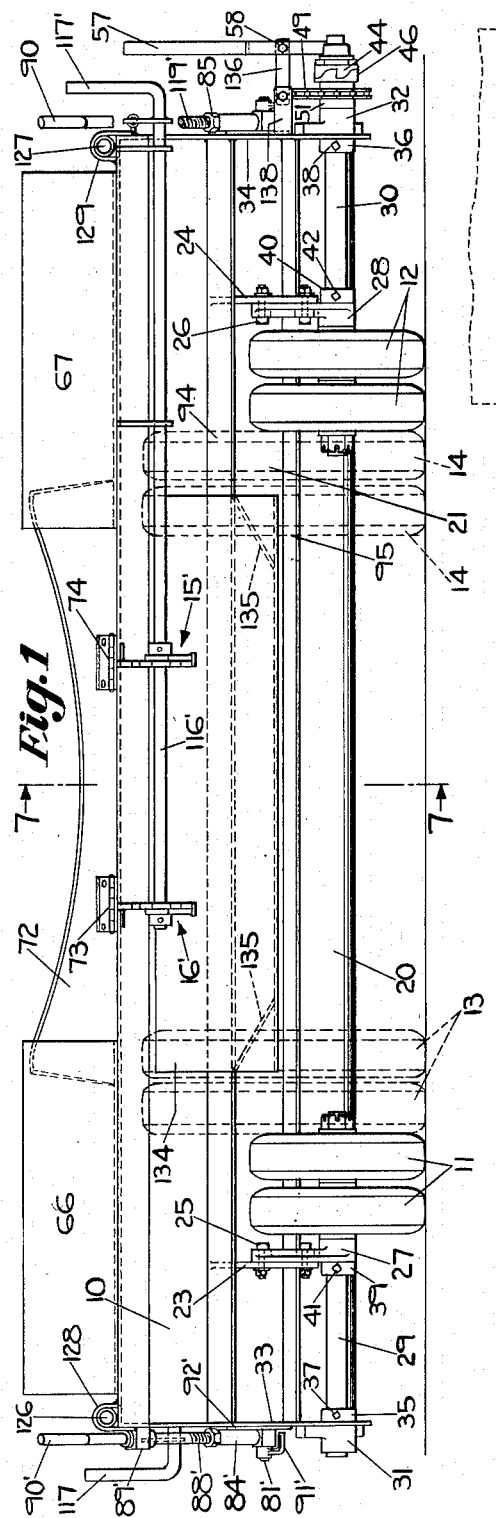
INVENTOR:
FRANKLIN E. ARNDT,
BY
Chas. M. Niessen,
ATTY.

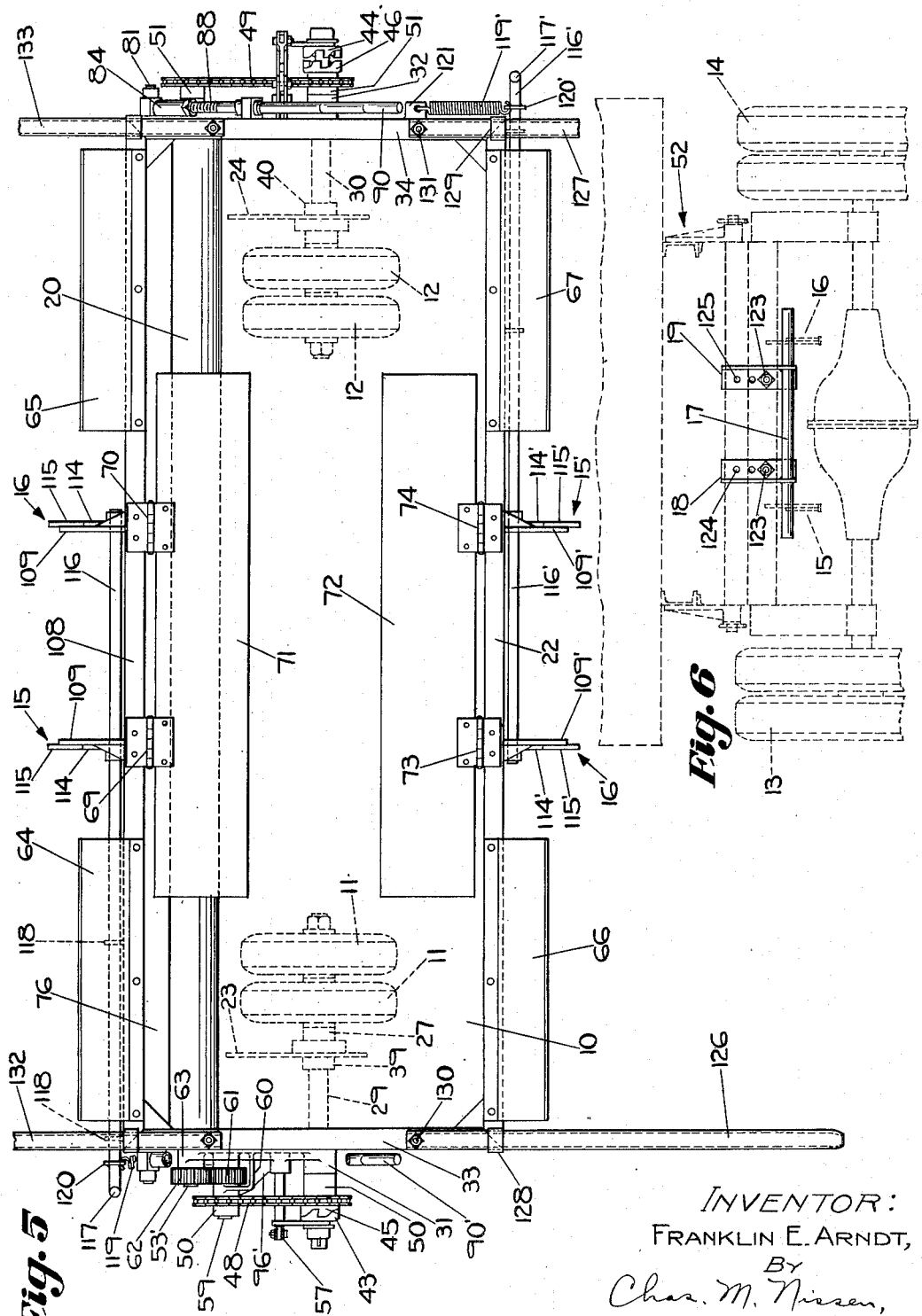

INVENTOR:
FRANKLIN E. ARNDT,
BY
Chas. M. Nissen,
ATTY.

Patented Aug. 19, 1941

2,252,690

UNITED STATES PATENT OFFICE 2,252,690

MATERIAL SPREADER

Franklin E. Arndt, Galion, Ohio, assignor to The Galion Iron Works & Manufacturing Company, a corporation of Ohio Application March 19, 1937, Serial No. 131,837

6 Claims. (Cl. 275—2)

My invention relates to road material spreaders of the type which is adapted to be hitched to and hauled behind a dumping truck traveling along the roadway, and one of the objects of the invention is the provision of improved and efficient apparatus for spreading material along a roadway in either direction of travel along the same.

Another object of the invention is the provision of improved automatic driving mechanism for a feed roll located at the discharge opening at the bottom of a hopper containing the material to be spread.

Another object of the invention is the provision of improved valve mechanism and means for adjusting the same so as to vary the amount of material delivered from the spreader traveling along the roadway.

A further object of the invention is the provision of a spreader which extends substantially beyond the sides of the path of travel of the draft vehicle to which the spreader is connected.

A further object of the invention is the provision of improved sectional hopper extensions to facilitate delivery of material to a spreader from a dumping truck.

Another object of the invention is the provision of improved mechanism for balancing a spreader to facilitate its manual adjustment and its connection to a draft vehicle.

More particularly it is the object of the present invention to provide driving mechanism for the feed roll of the spreader to enable driving the feed roll in the same direction irrespective of the direction of travel of the spreader of which the feed roll is a part.

Other objects of the invention will appear hereinafter, the novel features and combinations being set forth in the appended claims.

In the accompanying drawings,

Fig. 1 is a rear view of my improved spreader, with the feed roll connected to the right-hand set of wheels to be driven thereby when the spreader is moved forwardly;

Fig. 2 is a right-hand elevational view of Fig. 1 with the forward hitching mechanism connected to the rear end of the frame of a dumping truck shown in dotted lines;

Fig. 2a is a fragmentary view of structure at the right-hand end of Fig. 1;

Fig. 3 is a sectional view taken on the line 3—3 of Fig. 2, looking in the direction of the arrows;

Fig. 4 is a plan view of the truck drawbar mounted on brackets connected to a truck frame channel shown in section;

Fig. 5 is a plan view of a spreader showing driving connections to both sets of supporting wheels;

Fig. 6 is a rear elevational view of the drawbar structure with the rear end of the dumping truck shown in dotted lines and portions of the hitching devices shown in dotted lines to show the relation of the drawbar mechanism to the truck and to the hitching mechanism;

Figure 7:
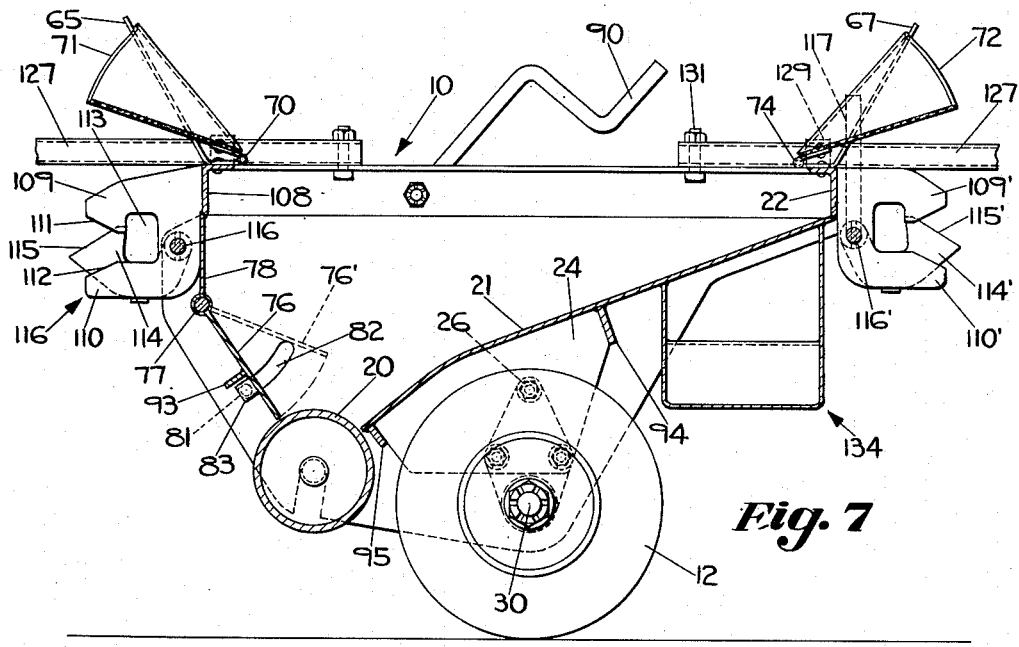
Fig. 7 is a sectional elevational view taken on the line 7—7 of Fig. 1, looking in the direction of the arrows.

In the first place it should be understood that the hopper shown in Figs. 1 and 5 is adapted to extend substantially beyond both sides of the draft vehicle or hauling dumping truck shown in dotted lines in Fig. 6. The hopper 10, as shown in Figs. 1 and 5, is supported upon wheels 11 and 12 which are set inwardly from the lateral end walls of the hopper so as to track just outside of the paths of travel of the wheels 13 and 14 of the truck shown in dotted lines in Fig. 6. That is to say, when the hitching devices 15 and 16 at the front side of the spreader are connected, as shown in dotted lines in Fig. 6, to the drawbar 17 secured by means of the brackets 18, 19 to the rear end of the dumping truck, the wheels 11 and 12 of the spreader will travel along paths immediately outside of the paths of travel of the wheels 13, 14 of the dumping truck.

The hopper 10 comprises an open top and an open bottom, and in the latter is located the feed roll 20, as shown in Fig. 7. The bottom wall 21 of the hopper slopes downwardly from the transverse angle iron 22 to the feed roll 20. On the underside of the bottom wall 21 are secured by means of welding, the bracket plates 23, 24 to which are secured by means of the bolts 25, 26, as shown in Fig. 1, the journal bearings 27, 28 for the inwardly extending supporting wheel shafts 29, 30. The wheels 11 and 12 are keyed to the shafts 29 and 30 to rotate therewith, as illustrated in Fig. 8.

The outer ends of the shafts 29 and 30 are journaled in bearings 31, 32 which are secured to the end walls 33, 34 of the elongated hopper. Bearing against the inner walls of the end plates 33, 34 of the hopper are collars 35, 36 which are secured to the shafts 29 and 30 by means of set screws, as illustrated at 37, 38 in Figs. 1 and 8. Collars 39 and 40 are respectively located on the shafts 29 and 30 at the outer sides of the journal bearings 27 and 28 and these collars 39 and 40 may be secured to the shafts 29 and 30 by means of the set screws 41, 42, as shown in Fig. 1.

Figure 8:
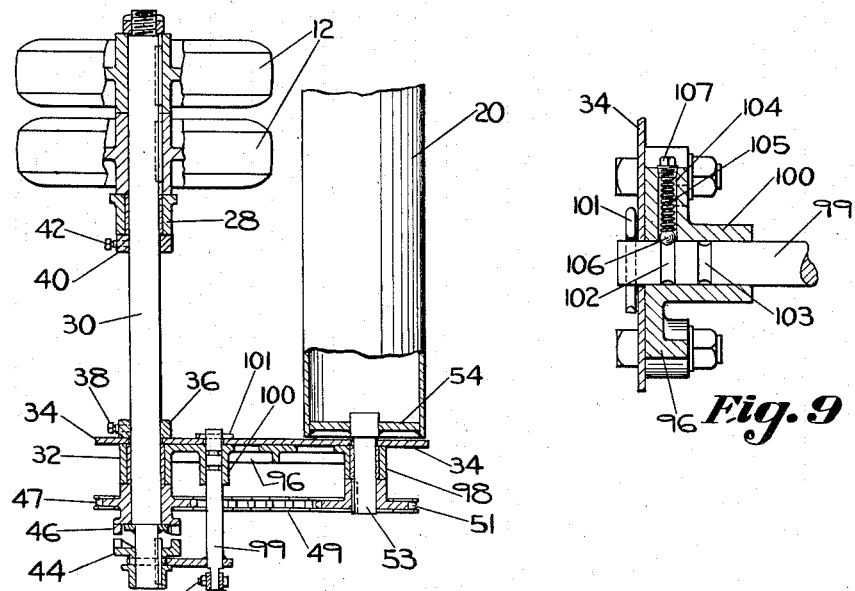
Fig. 8 is a sectional plan view taken on the line 8—8 of Fig. 2.

Splined to the outer ends of the shafts 29 and 30 are the jaw clutch elements 43 and 44, as shown in Figs. 5 and 8. Associated with the jaw clutch elements 43, 44 are the slip clutch elements 45, 46 which are loosely journaled on the shafts 29 and 30. The slip clutch elements 45 and 46 are connected to sprockets one of which is shown in section at 47 in Fig. 8. The sprockets of the slip clutch elements 45, 46 mesh with sprocket chains 48, 49 which mesh with spaced sprockets 50 and 51, as shown in Fig. 5.

When the dumping truck 52, shown in dotted lines in Fig. 2, moves forwardly or toward the right as viewed in Fig. 2, the wheels 12 will drive the clutch element 44 in proper direction to drive the chain 49 when the clutch is applied and consequently the sprocket 51 will be rotated in a clockwise direction as viewed in Fig. 2. By referring to Fig. 8 it will be seen that the sprocket 51 is keyed to a stub shaft 53 which extends through the adjacent end wall 34 of the hopper 10, and thence through a central perforation of the disk 54 which is welded at its periphery to the inner end walls of a hollow metal feed roll 20. The inner end of the stub shaft may also be welded to the disk 54, as shown in Fig. 8. Consequently when the wheels 12 rotate clockwise, as viewed in Fig. 2, with the clutch 44, 46 thrown in, the sprocket and chain drive mechanism will effect rotation of the feed roll 20 in a clockwise direction as viewed in Fig. 2. Consequently material in the hopper will be fed gradually in a thin stream transversely across the path of travel of the truck 52 and substantially beyond both sides of such path.

The clutch element 44 which is splined to the outer end of the shaft 30 may be applied or released by means of the shipper 55 pivoted at 56 to the lower end of the operating lever 57 which is pivoted at 58 to the outer wall of the hopper end plate 34. By means of manually operated shipper mechanism similar to that shown in Fig. 2, the clutch element 43 at the left-hand end of Fig. 5 may be applied or released.

When the dumping truck 52 pulls the spreader toward the right as viewed in Fig. 2, the wheels 11 and 12 drive the shafts 29 and 30, each in a clockwise direction as viewed in Fig. 2, and consequently the outer clutch elements 43 and 44 are also driven in a clockwise direction as viewed in Fig. 2. By reason of the reversal of the clutches at opposite ends of the hopper, as shown in Fig. 5, only one of the clutches can be held applied when the hopper is traveling in a given direction. For instance, when the spreader moves toward the right, as viewed in Fig. 2, only the clutch at the right-hand end of Fig. 5 can be applied since the clutch element 43 will slip past the clutch element 45 and not effect any driving by means of the sprocket chain 48. In a similar manner, if the truck 52 is backed or moved rearwardly or toward the left, as viewed in Fig. 2, the clutch element 44 will slip past the clutch element 46 and not effect any driving of the chain 49, but by such rearward movement of the truck 52 the clutch 43, 45 may be applied and remain so, to effect continuous driving of the chain 48 during rearward movement of the truck 52.

It should be particularly observed that the sprocket 50 at the left-hand end of Fig. 5 is mounted on a stub shaft 59 journaled in a bracket support 60 on the outer wall 33 of the hopper 10. Keyed to the stub shaft 59 is a sprocket 50 and keyed to the same stub shaft 59 is a pinion 61 meshing with a gear 62 which is keyed to the stub shaft 53' journaled in the bearing 63 which may be connected rigidly to the bracket 60. The gear 62 is keyed to the stub shaft 53' corresponding to the stub shaft 53 of Fig. 8 because such stub shaft 53' is connected to the other end of the feed roll 20 in the manner illustrated in Fig. 8. The rearward movement of the truck 52 of Fig. 2 will cause the sprocket chain and spur gearing shown at the left-hand end of Fig. 5, to transmit rotation to the feed roll 20 in the same direction as when the truck 52 moves forwardly. That is to say, when the truck 52 moves toward the right, as viewed in Fig. 2, the sprocket and chain gearing at the right-hand end of Fig. 5 will rotate the feed roll 20 in a clockwise direction, and when the truck 52 moves rearwardly and the sprocket chain gearing and spur gearing at the left-hand end of Fig. 5 are operated, the feed roll 20 will again be driven in a clockwise direction, as viewed in Fig. 2, by reason of the reverse gearing 61, 62.

Inasmuch as the hopper of the spreader extends transversely of the roadway a substantial distance beyond both sides of the path of travel of the dumping truck, it is desirable to provide spaced-apart outwardly extending aprons or sectional deflecting plates 64, 65 secured to the upper edges of the hopper at one side thereof, and also similar aprons 66, 67 secured to the outer edges of the opposite side of the hopper, as illustrated in Fig. 5. Intermediate the apron plates 64, 65 at the edge 108 of the hopper is hinged at 69, 70 a rectangular sheet of stiff flexible material, such as rubber or rubber belting 71, so that when swung upwardly to the position shown in Fig. 1 it may flexibly connect the inner edges of the adjacent fixed or stationary apron plates 64 and 65. In a similar manner a rectangular sheet of heavy or stiff flexible material, such as rubber or rubber belting 72, is hinged at 73, 74 to the edge 22 of the hopper between the fixed or stationary apron plates 66, 67. Fig. 1 being a rear view of the spreader, shows the flexible member 72 in position to connect the inner edges of the stationary or fixed apron plates 66 and 67. With the flexible members 71 and 72 in their upper positions to connect the inner edges of the plates 64, 65 and 66, 67, the forward and rear walls of the hopper are in effect extended upwardly so as to prevent spilling of the material when dumped from the truck into the hopper and also enable loading of the material heaping full into the hopper without spilling beyond the upper edges of the hopper.

For the purpose of controlling the rate of flow of the material from the hopper 10 by means of the feed roll 20, I have provided an elongated gate or valve 76 of sheet metal sufficiently flexible to permit different degrees of bending at opposite ends while its lower edge is associated with the feed roll 20, as shown in Fig. 7. The gate 76 is an elongated rectangular plate pivoted at 77 by means of a sectional tubular hinge, to the lower edge of the vertical wall 78 of the hopper 10.

Connected to opposite ends of the valve 76 is mechanism for adjusting the same to vary the discharge opening between the lower edge of the valve 76 and the upper surface of the feed roll 20. By referring to Fig. 3 which is a sectional view taken on the line 3—3 of Fig. 2, looking in the direction of the arrows, it will be seen that a bar 79 is bolted at 80 to one end of the valve plate 76. The bar 79 carries a stub shaft 81 which extends through the slot 82 in the end wall plate 34 of the hopper 10. The shaft 81 is journaled in the bearing 83 carried at the lower end of the tube 84, to the upper end of which is secured a cap 85 having a screw-threaded opening therein. By means of a collar 86 and a cotter pin 87 the journal bearing 83 is held in its place on the shaft 81, as shown in Fig. 3.

Screw-threaded through the cap 85 is a screw-threaded rod 88 which is mounted intermediate its ends to rotate in the bearing 89 mounted on the outer wall of the hopper end plate 34, as shown in Fig. 2. A handle 90 is secured to the upper end of the rod 88. By manual rotation of the rod 88 the shaft 81 of Fig. 3 may be lifted or lowered and consequently the lower edge of the valve plate 76 may be adjusted in position relative to the feed roll 20, as may be readily understood by reference to Figs. 2 and 7.

Secured to the collar 86 is a pointer 91 associated with a scale 92 attached to the outer wall of the end hopper plate 34. The pointer 91 associated with the scale 92 may be relied upon to show the extent of the discharge opening between the plate 76 and the feed roll. Although the valve plate 76 is moved to the dotted line position indicated at 76' in Fig. 7, as permitted by the length of the slot 82, such plate 76 is in reality an extension of the vertical wall 78 of the hopper 10. The upper portion of the feed roll 20 is closely associated with the lower edge of the bottom wall 21 of the hopper 10. While the upper portion of the feed roll 20 extends into the open bottom of the hopper 10, the discharge opening is between the feed roll 20 and the lower edge of the valve 76, since the feed roll is always rotated in an anti-clockwise direction, as viewed in Fig. 7.

Mechanism for operating the valve 76 and for regulating the discharge opening, as shown in Figs. 2 and 3, is also provided at that end of the hopper 10 opposite to that shown in Fig. 2. The manual lever or handle 90' at the left-hand end of Figs. 1 and 5 corresponds to the handle 90 at the right-hand end. The handle 90 is connected to a rod journaled in a bearing 89', and the lower end of the rod is threaded at 88' into a tube 84' the lower end of which is journaled on the stub shaft 81' which is provided with a pointer 91' movable over the indicating scale 92'. Since the valve adjusting mechanism at opposite ends of the valve plate 76 is individually operable it will be seen that, particularly when the plate is elongated as shown in Figs. 1 and 5, it may be moved farther away from the feed roll 20 at one end than at the other end. This is advantageous when it is desired to spread material from the hopper more thickly at one side of the roadway than at the other side. For instance, the crowning of a roadway may be corrected by spreading material from the hopper more thickly at the outer portions of the roadway than at the center thereof. When it is thus desired to deflect or spiral the valve plate 76 to a greater degree at one end than the other, the valve operating devices at the opposite ends of the hopper are individually operated.

It can readily be seen by referring to Fig. 7 that when the hopper is full of material, considerable weight is exerted on the valve plate 76 since it constitutes one of the bottom walls of the hopper adjacent the discharge opening into which the feed roll 20 extends. The hopper is of extra length on account of its extension on opposite sides of the path of travel of the draft vehicle or hauling dumping truck. Consequently the plate 76 may tend to be bulged downwardly at its central portion, and to avoid this tendency I prefer to provide a reinforcing strip 93 on the bottom side of the valve plate 76 intermediate its upper and lower edges, as shown in Fig. 7. This reinforcing strip 93 may extend the entire length of the valve plate 76 and be welded thereto to occupy a position parallel to the lower edge of the plate 76 and intermediate such lower edge and the pivot between the plate 76 and the vertical wall 78 of the hopper 10.

While the reinforcing strip 93 resists bending strains exerted on the plate 76 in the plane of the strip 93 or parallel thereto, the strip 93 may nevertheless be twisted at its ends when subjected to torsional strains. Consequently even when the reinforcing strip 93 is located back of the valve plate 76 as shown in Fig. 7, one end of the feed plate 76 may be moved farther away from the feed roll 20 than the other end so as to effect spreading of material from the hopper more thickly at one side of the roadway than at the other side.

In order to strengthen the bottom wall 21 reinforcing strips 94 and 95 may be provided respectively midway between the upper and lower edges of the bottom wall 21 and at the lower edge, as shown in Fig. 7. As shown in Fig. 1 the reinforcing strips 94 and 95 extend the entire length of the hopper between the end walls 33 and 34. The reinforcing strips 94 and 95 may be welded to the underside of the bottom wall 21 of the hopper as well as to the vertical bracket plates 23 and 24 shown in Figs. 1 and 7.

The journal bearing 32 shown in Fig. 8 may be integral with the casting 96 which is adapted to be secured to the end wall 34 of the hopper by means of the bolts 97 shown in Fig. 2. The journal bearing 98 for the stub shaft 53 of Fig. 8 may also be integral with the casting 96. In a similar manner, the bracket 60 and journal bearings 31, 63 may be in a single casting 96' and secured to the end wall 33 of the hopper by being bolted thereto. The casting 96' is shown at the left-hand end of Fig. 5.

Figure 9:
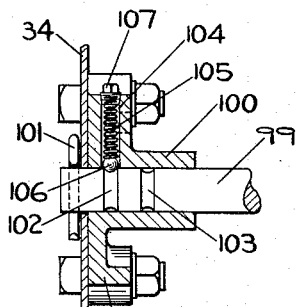
Fig. 9 is an enlarged sectional elevation to illustrate the mechanism for holding applied or released the clutch illustrated in Fig. 8.

As shown in Figs. 2ª, 8 and 9, the lower end of the lever 57 is pivoted at 56 to a horizontal latch rod 99 the inner end portion of which is mounted in the slide bearing 100 to extend through an opening in the hopper end plate 34. The latch rod 99 is locked to the plate 34 by means of the cotter pin 101. That portion of the latch rod 99 which extends into the slide bearing 100 is provided with spaced-apart annular grooves 102, 103 each of which is adapted to register with the radial cylindrical recess 104 in which is located a spring 105 in position to press on the latch ball 106. The spring 105 may be held in the cylindrical recess 104 by means of the bolt headed plug screw 107, as shown in Fig. 9. By reference to Figs. 2, 2ª, 8 and 9 it will be seen that when the clutch 44, 46 is released, the latch rod 99 will be pulled outwardly until the cotter pin 101 strikes the inner wall of the plate 34 where the latch ball 106 yieldingly rests in the annular groove 102. When the clutch 44, 46 is applied the latch rod 99 is pushed inwardly until the latch ball 106 rests in the groove 103. The clutch will then be held yieldingly applied by reason of the spring 105 pressing on the latch ball 106. It should also be noted that the cotter pin 101 acts as an abutment to prevent the sliding clutch element from being moved off the outer end of the shaft 30.

The spaced-apart hitching devices 15, 16 of Fig.

5 are preferably connected to the transverse bar on the rear end of the frame of the hauling truck, in the position shown in dotted lines 15 and 16 in Fig. 6. That is to say, the hitching devices 15 and 16 are mounted on the spreader at a sufficient distance apart to be located outside of the brackets 18, 19 of Fig. 6 and at such distances therefrom as to facilitate manual connection of the hitching devices to the drawbar 17. Furthermore the brackets 18, 19 act as abutments to prevent the spreader from shifting transversely relatively to the path of travel of the truck any more than limited distances.

The top of the hopper may comprise a rectangular frame composed of angle irons including the forward transverse angle iron 108, as shown in Fig. 7. The lower edges of the rectangular frame composed of angle irons at the open top of the hopper, may be welded to the upper edges of the end walls 33, 34, the upper edge of the bottom wall 21, and the upper edge of the vertical wall 78.

The hitching devices 15, 16 may each comprise an upper hooked jaw 109 and a lower abutment jaw 110, rigidly connected together or made integral and securely attached by means of welding or otherwise to the transverse angle iron 108 which extends along the forward edge of the upper side of the hopper 10. As shown in Fig. 7 the underside of the upper jaw 109 may be beveled at 111 and the lower abutment jaw may be beveled at 112 so that there will be a converging relation between the beveled surfaces 111, 112 toward the rectangular opening 113 between the upper and lower jaws 109, 110. It should be understood that each hitching device 15, 16 comprises a pair of upper and lower bevel jaws 109, 110.

Associate with each pair of jaws 109, 110 is a latch plate 114 the forward end of which is beveled at 115 in Fig. 7. Each of the two latch plates 114, 114 is pinned or otherwise secured to the rock shaft 116 to rock therewith when actuated by the handle 117 located on the outer side of the end wall 33 of the hopper 10. The rock shaft 116 may be mounted in the bearings 118, 118 on the forward side of the angle iron 108 at the upper forward edge of the hopper 10.

The latch 114 is hook-shaped and so associated with the jaws 109 and 110, as to connect the intervening space between the jaws at the inner ends of the beveled surfaces 111, 112 and thereby close the transverse opening 113 between the jaws. The latch plate 114 is held in the position shown in Fig. 7 by means of a spring 119, one end of which is connected to an anchorage on the outer wall of the plate 33, and the other end of which is connected to a plate 120 secured to the rock shaft 116. The rock shaft 116 is adapted to be actuated by the handle 117 against the action of the spring 119 to move the latch plate 114 downwardly as viewed in Fig. 7, and in this manner the hitching devices may be released from the drawbar 17 shown in Fig. 6. When the hitching devices 15, 16 are to be connected to the drawbar 17 the whole spreader as a unit may be manually moved about on the wheels 11, 12 until the beveled surfaces 115 of the latch plates 114 engage the underside of the drawbar 17, whereupon such engagement will automatically move the latch plates 114 downwardly against the action of the spring 119 until the latch plates snap over the rear end of the drawbar 17 whereupon the latter will be locked between the jaws 109, 110 to occupy a position in the transverse opening 113 of Fig. 7. It should be particularly noted that both latch plates 114 are always operated simultaneously either automatically when the spreader is pushed into place relative to the drawbar 17 or when the latch plates are operated manually to release the hitching devices 15, 16 from the drawbar 17.

The hitching devices 15', 16' on the opposite side of the hopper are similar in construction to the hitching devices 15 and 16 and include upper fixed jaws 109' and beveled latch plates 114' each provided with a forward beveled surface 115'. The latches 114' are operable by means of a rock shaft 116' and handle 117' located on the outer side of the end wall 34. The latches 114' are yieldingly held in place relative to the upper and lower fixed jaws, by means of the spring 119' which is connected at one end to the bracket 121 secured to the end wall 34 and serving as an anchorage for one end of the spring 119'. The other end of the spring 119' is connected to the plate 120' secured to the rock shaft 116'.

Inasmuch as frames of self-propelled dumping trucks such as that illustrated in dotted lines in Fig. 2, may be of various heights from the road surface, it is preferable to provide a transverse metal channel 122 provided with bolts 123 adapted to extend through one of the vertically spaced holes 124, 125 in the vertical bracket plates 18, 19 shown in Figs. 2 and 6. By means of this construction the drawbar 17 may be secured to the rear end of the frame of the self-propelled dumping truck so that the drawbar 17 will be held at such adjusted elevation as will conform with the height of the hitching devices 15, 16 relative to the road surface, when the horizontal upper frame of the hopper is in approximately level position. As shown in Figs. 4 and 6, the drawbar 17 extends through perforations in the lower ends of the vertical rearwardly projecting plates of the angle iron brackets 18 and 19, so as to facilitate welding or otherwise securing the drawbar 17 to the brackets 18 and 19.

In order to facilitate movement of the spreader on its wheels 11, 12 in order to connect the hitching devices 15, 16 to the drawbar 17, I provide rearwardly extending handle bars 126 and 127 securely mounted on the end plates 33, 34 of the hopper to extend rearwardly therefrom. Such handle bars 126, 127 may be in the form of pipes extending through loops 128, 129 on the rear corners of the rectangular frame of the hopper, and secured at their inner ends by means of bolts 130, 131 to the end angle irons of the rectangular frame of the hopper. On account of the extra length of the hopper, spreading of material from the hopper may be effected beyond the sides of the path of travel of the self-propelled dumping truck shown in dotted lines at 52 in Fig. 2. Consequently the handles 126 and 127 are located at opposite ends so that one or two persons may manually move the spreader about on its wheels 11, 12 until the spring pressed latches are automatically snapped over the drawbar 17 and the spreader is hitched to the draft vehicle or self-propelled dumping truck with the assurance that it will follow the path of travel of the dumping truck while having flexibility of up and down movement over irregularities in the roadway on the drawbar 17 as a pivot.

As shown in Figs. 2, 5 and 7, handle bars 132, 133 may also be provided on the opposite side of the spreader at the opposite corners and in alignment respectively with the handle bars 126 and 127. When the spreader is hitched to the dumping truck 52, as shown in Fig. 2, the forwardly extending handle bars 132 and 133 are located in such positions as to have ample clearance from the sides of the dumping truck.

Inasmuch as the spreader is overbalanced relative to the axes of the shafts 29 and 30, I have provided an open-ended box or receptacle 134 which may be welded to the lower side of the bottom 21 of the hopper, as shown in Fig. 2. Inwardly and downwardly inclined plates 135, 135 may be located at opposite ends of the balance box 134, as shown in Fig. 1. The end of this receptacle 134 being open above the inclined plates 135, 135, balancing material, such as weights or crushed stone, may be placed in the box or receptacle 134 at either end thereof. It is desirable to place balancing material in the box or receptacle 134 when the spreader is to be moved manually by grasping the handle bars for the purpose of hitching or unhitching the spreader to or from the dumping truck 52. During transportation of the spreader at full speed of the truck which hauls the same, the box 134 is preferably empty.

During rapid transportation along the highway of the spreader while being hauled by a draft vehicle, the rear hitching mechanism may be used to haul a trailer, a spreader, or any other vehicle. The main purpose of providing the hitching mechanism both on the front side and on the rear side of the hopper is to reduce the cost of the spreader by omitting one of the driving connections between the feed roll and one set of supporting wheels, either the set of wheels designated 11 or the set of wheels designated 12 in Figs. 1 and 5. For instance, in Fig. 2 the transmission mechanism from the wheels 11 to the feed roll 20 is omitted and only the transmission mechanism from the wheels 12 to the feed roll is included. In the arrangement shown in Fig. 1 the feed roll 20 is between the wheels 12 and the wheels of the dumping truck 52. The slip clutch 44, 46 of Fig. 1 when applied will effect driving of the feed roll 20 in a clockwise direction, as viewed in Fig. 2, when the hauling vehicle moves forwardly. When the spreader is connected to the truck 52, as shown in Fig. 2, and the truck is moved rearwardly, the clutch 44, 46 will be automatically released and consequently the feed roll 20 will not be driven. By turning the spreader end for end, however, so as to connect the hitching mechanism 109', 110', 114' to the drawbar 17, rearward movement of the truck may be relied on to drive the feed roll 20 in the proper direction to feed the material from the hopper under the lower edge of the valve or gate plate 76 as regulated thereby.

It is preferred, however, to provide reverse transmission mechanism between the feed roll 20 and both sets of wheels 11 and 12 because then the feed roll 20 may be located rearwardly of the wheels 11, 12 so as to feed priming or semi-liquid material onto the roadway without permitting either the wheels of the spreader or the wheels of the hauling vehicle to contact with the same. Then by filling the hopper with dry material, such as crushed stone or gravel, such dry material by rearward movement of the truck and the spreader, may be fed onto the previously spread priming material, and in that event the wheels of the spreader and the wheels of the truck will come in contact only with the upper layer of dry material.

When transmission mechanism between both sets of wheels 11, 12 and the feed roll is included in the spreader mechanism, the hitching devices 15, 16 may be omitted and in that event the spreader shown in Fig. 2 is turned end for end so as to connect the hitching devices 15', 16' to the drawbar 17 with the feed roll located rearwardly of the wheels 11, 12. It can readily be seen by referring to Figs. 2 and 5 that when the spreader is hitched to the rear end of the frame of the truck with the feed roll 20 rearwardly of the wheels 11, 12, forward movement of the truck will effect driving of the sprocket chain 48, and rearward movement of the truck will effect driving of the sprocket chain 49. That is to say, the feed roll 20 will always be driven in a clockwise direction when viewed from the end of the hopper where the end plate 34 is located, and this is true whether the truck moves forwardly or rearwardly provided both of the feed roll transmission mechanisms shown in Fig. 5 are included in the spreader.

Reverting to the pivot 58 of the lever 57 shown in Figs. 1, 2 and 2ᵃ, it should be noted that the pivot 58 is at the outer end of the link 136 the inner end of which is pivoted at 137 to the outer end of a bracket 138 which may be welded to the outer wall of the hopper end plate 34.

Reverting also to the mechanism for adjusting or spiralling the gate or valve plate 76, attention is called to the welding of the nut 85 to the upper end of the tube 84 and the welding of the lower end of the latter to the journal bearing 83. It will thus be seen that the rod 88 is screw-threaded through the upper end of a connection comprising the nut 85, the tube 84 and the journal bearings 83 rigidly connected together into a single unit to form an extension of the rod 88 which is rotatable in the bearing 89 without moving endwise relatively thereto, but such bearing may be either loosely fitting or swivelled to the rectangular frame of the hopper so as to permit arcuate movement of the stub shaft 81 on the hinge 77 as a center.

The hitching mechanism hereinbefore described and shown in the accompanying drawings, is disclosed and claimed in my divisional application, Serial No. 165,054, filed September 22, 1937, for an improvement in Material spreaders.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a material spreader, the combination with a hopper, of spaced-apart wheels for supporting said hopper, a feed roll for a discharge opening in the bottom of said hopper, separate driving mechanisms connected between said wheels and said feed roll and comprising reversely arranged clutches, and lever operated devices one associated with each clutch for applying and releasing the same, only one of said clutches being effective when the hopper travels either forwardly or rearwardly.

2. In a material spreader, the combination with an open top hopper having a discharge opening in its bottom, of a feed roll associated with said discharge opening, coupling mechanism adapted to connect said hopper to a draft vehicle, spaced-apart wheels for supporting said hopper, driving connections comprising reverse slip clutches between said wheels and said feed roll to effect rotation of said feed roll always in the same direction relatively to said hopper whether the draft vehicle pulls or pushes the spreader along the roadway.

3. In a material spreader, the combination with an open top hopper having a bottom discharge opening, of a feed roll associated with said discharge opening, wheels for supporting said hopper with the feed roll spaced above the road surface, coupling mechanisms on opposite sides of the hopper and adapted to connect said hopper to a dumping truck, and mechanism including slip clutches for driving the feed roll always in the same direction relatively to the hopper whether the dumping truck while moving forwardly is connected to one coupling mechanism or the other.

4. A material spreader comprising a hopper having an open top and an open bottom, a feed roll in the open bottom for discharging material from the hopper through the open bottom, bracket plates extending downwardly from the ends of said hopper, a rotary shaft journaled to one of said bracket plates and extending inwardly from one end of said hopper in parallelism to the axis of said feed roll, ground engaging supporting wheel structure at the inner end of said shaft, a sprocket loosely journaled on said shaft, another sprocket keyed to said feed roll to rotate therewith, a drive chain connecting said sprockets, a slip clutch for connecting said shaft to said first-named sprocket to effect rotation of said feed roll in feeding direction only, and yielding releasable mechanism operable entirely automatically for holding the clutch in or out.

5. In a material spreader, the combination with an elongated hopper having an open top extending throughout its length, of mechanism for flexibly hitching such spreader to a dumping truck, supporting wheels set inwardly from the lateral ends of the hopper, a feed roll at a discharge opening in the bottom of said hopper for discharging material, the discharge opening being co-extensive with the opening in the top of the hopper, and the material dumped from the truck being free to spread laterally along such top opening toward both lateral ends of the hopper, and mechanism comprising slip clutches between the wheels and said feed roll to drive the latter in feeding direction only whether the dumping truck pushes or pulls the spreader.

6. In a material spreader, the combination with an open top hopper having a discharge opening in its bottom, of a feed roll associated with said discharge opening, spaced-apart ground engaging wheels for supporting said hopper, coupling mechanism adapted to connect said hopper to a draft vehicle, driving connections comprising a reverse slip clutch between one of said wheels and said feed roll to drive the latter in feeding and spreading direction when the hopper is moved forwardly, said clutch being automatically released when the direction of movement of the hopper is reversed, additional driving connections comprising another reverse slip clutch between another of said wheels and said feed roll to drive the latter in feeding and spreading direction when the hopper is moved rearwardly, said last-named clutch being automatically released when the direction of movement of the hopper is reversed, manual means for individually applying said clutches, and means associated with each clutch to hold the same applied until automatically released by the aforesaid reverse movements of the hopper.

FRANKLIN E. ARNDT.